US008998117B2

(12) United States Patent
Bauman et al.

(10) Patent No.: US 8,998,117 B2
(45) Date of Patent: Apr. 7, 2015

(54) IRRIGATION SYSTEM WITH SMART HYDRANTS AND RELATED METHOD

(75) Inventors: Mark A. Bauman, College Place, WA (US); Chad D. Leinweber, Walla Walla, WA (US); Craig B. Nelson, Walla Walla, WA (US); Robert L. Rupar, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 1281 days.

(21) Appl. No.: 12/213,801

(22) Filed: Jun. 24, 2008

(65) Prior Publication Data

US 2009/0314862 A1 Dec. 24, 2009

(51) Int. Cl.
*B05B 3/00* (2006.01)
*A01G 25/09* (2006.01)

(52) U.S. Cl.
CPC ................................. *A01G 25/097* (2013.01)

(58) Field of Classification Search
CPC ..... A01G 25/09; A01G 25/097; A01G 25/16; A01G 25/165
USPC ................. 239/71–73, 743–749, 69
See application file for complete search history.

(56) References Cited

U.S. PATENT DOCUMENTS

| | | | |
|---|---|---|---|
| 3,583,636 A | 6/1971 | Lacey | |
| 4,877,189 A | 10/1989 | Williams | |
| 5,740,038 A | 4/1998 | Hergert | |
| 5,927,603 A | 7/1999 | McNabb | |
| 6,133,835 A * | 10/2000 | De Leeuw et al. | 340/572.5 |
| 6,230,091 B1 | 5/2001 | McQuinn | |
| 6,431,475 B1 * | 8/2002 | Williams | 239/750 |
| 6,554,188 B1 | 4/2003 | Johnson et al. | |
| 6,688,535 B2 | 2/2004 | Collins | |
| 6,721,630 B1 | 4/2004 | Woytowitz | |
| 6,726,132 B2 | 4/2004 | Malsam | |
| 6,847,892 B2 | 1/2005 | Zhou et al. | |
| 6,898,467 B1 | 5/2005 | Smith et al. | |
| 6,996,457 B2 | 2/2006 | Williams et al. | |
| 7,010,396 B2 | 3/2006 | Ware et al. | |
| 7,051,952 B2 | 5/2006 | Drechsel | |
| 7,069,115 B1 | 6/2006 | Woytowitz | |
| 7,123,993 B1 | 10/2006 | Freeman et al. | |
| 7,184,423 B2 | 2/2007 | Bryan et al. | |
| 7,225,037 B2 | 5/2007 | Shani | |
| 7,300,004 B2 * | 11/2007 | Sinden et al. | 239/722 |
| 2002/0134868 A1 | 9/2002 | Hansen | |

(Continued)

OTHER PUBLICATIONS

Wang et al.: "Wireless sensors in agriculture and food industry—Recent development and future perspective," Computers and Electronics in Agriculture, 50 (2006) pp. 1014, online at www.sciencedirect.com.

(Continued)

*Primary Examiner* — Christopher Kim
(74) *Attorney, Agent, or Firm* — Nixon & Vanderhye P.C.

(57) ABSTRACT

An irrigation system is composed of a mobile sprinkler cart; a system water supply pipe supporting a plurality of hydrants adapted to be engaged by the mobile sprinkler cart and to supply water to a sprinkler supported on the cart; and an addressable electronic ID tag mounted on each hydrant. A main controller is programmed to control operation of the mobile sprinkler cart, and the ID tag is adapted to send at least hydrant identifying data to the main controller to thereby enable the main controller to move the mobile sprinkler cart to the hydrant.

26 Claims, 4 Drawing Sheets

(56) References Cited

U.S. PATENT DOCUMENTS

2005/0077401 A1* 4/2005 Sinden et al. ............... 239/722
2006/0202051 A1 9/2006 Parsons et al.
2007/0018832 A1 1/2007 Beigel et al.

OTHER PUBLICATIONS

"Article Claims Population Cull May be Done Via Our Water Supply," online at www.portland.indymedia.org/en/2007/06/361175.shtml, Oct. 4, 2007, pp. 1-9.

Staedter: "'Thirsty Crop' Sensors Save Water," online at www.dsc.discover.com/news/2007/07/09/thirstycrop_tec.html, Oct. 4, 2007, pp. 1-3.

"Developing and Assessing Precision Farming Techniques for Southern Agricultural Production," The University of Georgia Engineering, Department of Biological and Agricultural Engineering online at www.engr.uga.edu/more_info.php?User_ID=52&ID=69&type=research, Oct. 4, 2007, pp. 1-6.

* cited by examiner

IRRIGATION SYSTEM WITH SMART HYDRANTS AND RELATED METHOD

FIELD OF THE INVENTION

The present invention relates generally to an irrigation system and more specifically to an automatic sprinkler system that includes a single or plurality of dockable mobile sprinkler carts or vehicles operable to sequentially travel to and dock with one of a plurality of hydrants, and to then distribute water provided by the hydrants to irrigate a local area proximate to each of the plurality of hydrants.

BACKGROUND OF THE INVENTION

Mobile irrigation systems having elevated boom or truss assemblies carrying multiple sprinklers are typically of the center pivot-type or the linear- (or lateral-) move-type. In a center-pivot machine, the elevated truss assembly pivots about an upright standpipe that supplies water to the sprinklers attached to the truss assembly. In a linear-move machine, the elevated truss assembly is carried on mobile, wheeled towers that move the machine linearly along a path that is perpendicular to the elevated boom or truss. Typically, the linear-move machine travels from one end of a field to the other and back again, and sprinkling typically occurs in both directions, with water supplied by hose, spaced hydrants or adjacent water-filled ditch or culvert.

In still other systems, a mobile traveler or cart moves along an above-ground pipe, docking with hydrants spaced along the pipe. See, for example, commonly-owned U.S. Pat. Nos. 7,300,004 and 7,140,563 incorporated herein by reference. In a variation of this arrangement, the pipe is below ground, eliminating the primary steering component used by the cart to move between hydrants. In some cases, buried guide wires are used to steer the cart. There remains a need, however, for a relatively simple and reliable system for guiding a mobile sprinkler cart along an above-ground pipe or across a field to engage a plurality of hydrants (in sequence) in accordance with a programmed sprinkling policy that controls the application of water to the field at each hydrant.

SUMMARY OF THE INVENTION

The exemplary but nonlimiting embodiments disclosed herein relate to the use of electronic identification (ID) tags, e.g., Radio Frequency ID (RFID) tags, on water supply hydrants in an irrigation system. More specifically, the ID tags are used to guide a mobile sprinkler cart (or traveler) to a hydrant located along a water supply pipe that itself may be above or below ground. The ID tag may also store data relating to sprinkler parameters such as sprinkling time and arc coverage, that will govern the operation of the sprinkler at that hydrant location. Optionally, semi-active RFID technology may be employed such that the RFID tag can both send and receive signals from a main controller.

Accordingly, in one aspect, the invention relates to an irrigation system comprising a mobile sprinkler cart; a system water supply pipe supporting a plurality of hydrants adapted to be engaged by the mobile sprinkler cart and to supply water to a sprinkler supported on the cart; an addressable electronic ID tag mounted on each hydrant; and a main controller programmed to control operation of the mobile sprinkler cart, the ID tag adapted to send at least hydrant identifying data to the main controller to thereby enable the main controller to move the mobile sprinkler cart to the hydrant.

In another aspect, the invention relates to an irrigation system comprising a mobile sprinkler cart; a system water supply pipe supporting a plurality of hydrants adapted to be engaged by the mobile sprinkler cart and to supply water to a sprinkler supported on the cart; an addressable electronic identification tag mounted on each hydrant; and a main controller programmed to control operation of the mobile sprinkler cart; wherein the electronic identification tag programmed to at least send signals to the main controller.

In still another aspect, the invention relates to an irrigation system hydrant comprising a fluid outlet adapted to supply water to a mobile sprinkler cart, the hydrant having an electronic ID tag affixed thereto, programmed to transmit signals to the mobile sprinkler cart to enable the mobile sprinkler cart to find and engage the hydrant.

In still another aspect, the invention relates to a method of irrigating a field bounded by a plurality of spaced hydrants connected by a water supply pipe and actuatable by engagement with a mobile sprinkler cart carrying a hydrant valve actuator in communication with a sprinkler, the method comprising: (a) utilizing an odd number of the plurality of hydrants; and (b) moving the mobile sprinkler cart to engage and actuate every other one of the odd number of hydrants.

In still another aspect, the invention relates to a method of guiding a mobile sprinkler cart carrying a programmable sprinkler to a hydrant comprising: (a) providing a datum reference for establishing a reference angular offset of the sprinkler cart relative to a hydrant to be addressed and associated with a specific watering pattern; (b) determining an actual angular offset of the sprinkler cart relative to the hydrant as the sprinkler cart approaches the hydrant; and (c) adjusting the sprinkler to repeat the specific watering pattern at the hydrant regardless of the current angular offset of the sprinkler cart relative to the hydrant.

The invention will now be described in greater detail in connection with the drawings identified below.

DETAILED DESCRIPTION OF THE INVENTION

Figure 1:
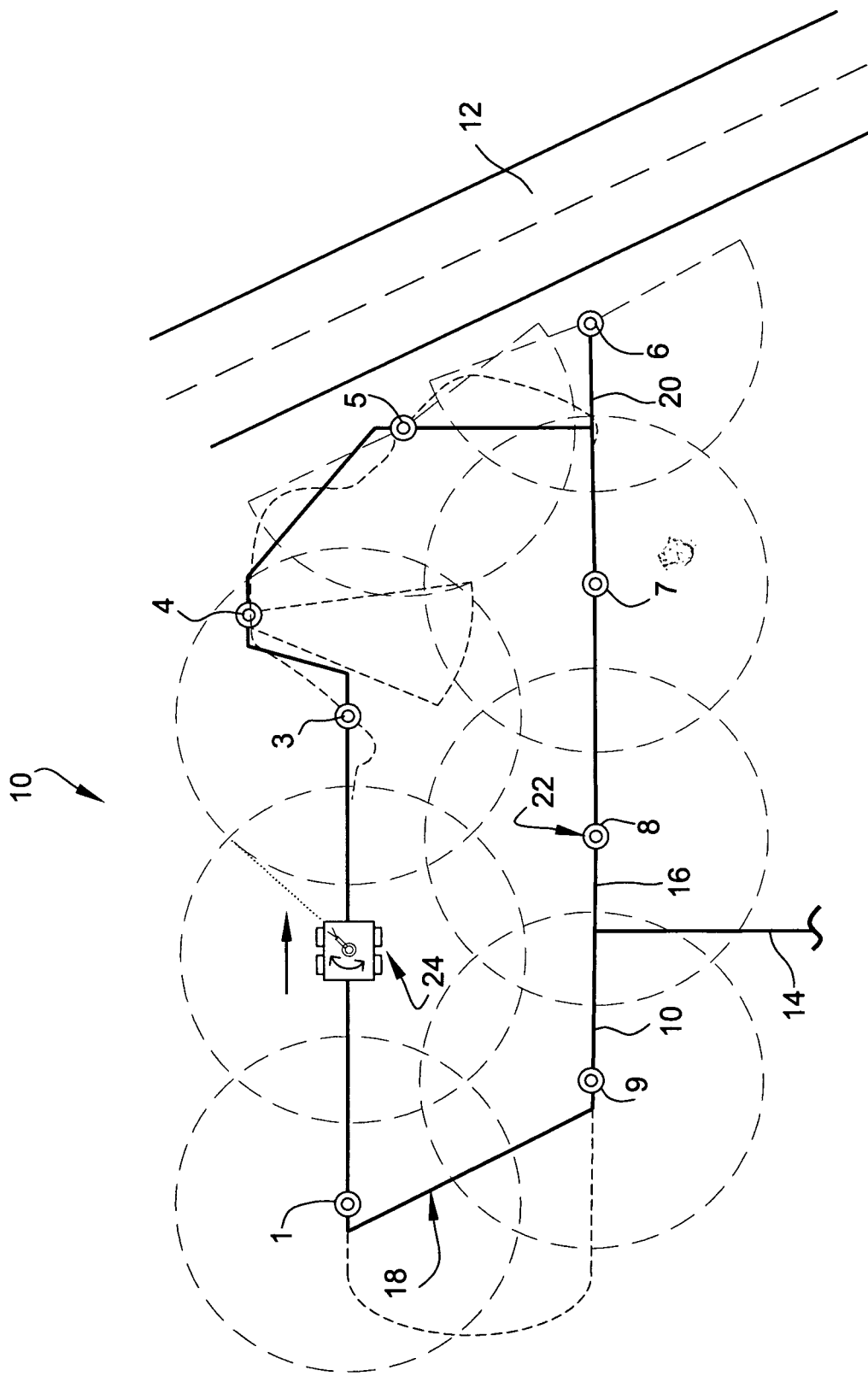
FIG. 1 is a schematic diagram of a mobile sprinkling system in a closed loop configuration with nine hydrants.

Referring to FIG. 1, an exemplary but nonlimiting implementation of the invention is illustrated in schematic form. Specifically, an autonomous sprinkling system 10 is positioned over a land area that is bounded by a road 12. The sprinkling system has a main source pipe 14 which transports a supply of irrigation water to the system. The main source pipe is connected to a sprinkler system supply pipe 16 that is arranged on portions of the land to be irrigated. In the illustrated example, the pipe is arranged in a closed loop 18 with an open-loop spur 20, and the water supply pipe 16 is laid out on top the ground. This embodiment enables the system to be portable or temporary, so it can be easily moved from one land area to another. In other embodiments, the water supply pipe may be arranged differently (for example, in open-ended and branched layouts, etc.) and/or the pipe may be buried in the ground. The latter arrangement is especially useful for fixed, permanent installations where full access is required over the entire land area. In an alternate embodiment, the system supply pipe 16 may be connected to a plurality of water source pipes 14 which enables the sprinkler system supply pipe to be constructed using pipe of a smaller diameter since flow losses are reduced.

As shown, a plurality of hydrants 22 are supported on the sprinkler system supply pipe 16, and are positioned at specific desired locations over the land area. These hydrants are mounted in an above-ground configuration and operable to mate with a mobile sprinkler cart 24 whose construction and operation will be discussed in further detail below. Hydrant spacing is determined by the extent of the desired overlap in sprinkling patterns derived at each site. As shown in FIG. 1, the hydrant (and hence the sprinkler) spacing is designed to achieve an approximate 50 percent throw radius overlap with adjacent site patterns.

A single or a plurality of mobile sprinkler carts 24 are adapted to travel and to mount, or otherwise dock with, each of the plurality of hydrants 22 and to emit and distribute a flow of fluid in a controlled manner from a sprinkler mounted on the cart over an area of land to be irrigated. Each mobile sprinkler cart 24 is operable to travel in a forward direction, or alternatively, to travel in an opposite or reverse direction in response to a sequence or watering policy. In the nonlimiting exemplary embodiment shown in FIG. 2, the mobile sprinkler cart 24 is mounted on a set of four wheels 26, and is adapted to straddle the above-ground supply pipe 16, utilizing steering arm assemblies 60, 62 to follow the pipe. Examples of a mobile sprinkler cart suitable for use in the system disclosed herein may be found in commonly owned U.S. Pat. Nos. 7,300,004 and 7,140,563. In another embodiment, each mobile sprinkler cart may be mounted on a set of two endless tracks (not shown). The mobile sprinkler cart 24 is powered by an on-board battery 27 (FIG. 2) and diesel engine 28 (FIG. 3).

In the specific but nonlimiting example shown in FIG. 1, the system is set up with an odd number of hydrants 22 (numbered 1 through 9, with the second hydrant hidden by cart 24), positioned along the sprinkler system supply pipe 16. A watering policy is provided which operates the mobile sprinkler cart 24 so that it follows a sequence which includes the steps of irrigating on a hydrant for a set period of time, skipping the next adjacent hydrant in the pattern, and then traveling to and docking with the next following hydrant in the pattern. This alternating-hydrant process is repeated over a set period of time. In this manner, an effective irrigation pattern is established which provides a desirable sprinkling rate for a variety of soil types and various terrain landscapes. In addition, by skipping every other hydrant of an odd number of hydrants, the desirable practice of sprinkling on dry land at each hydrant is assured.

Figure 2:
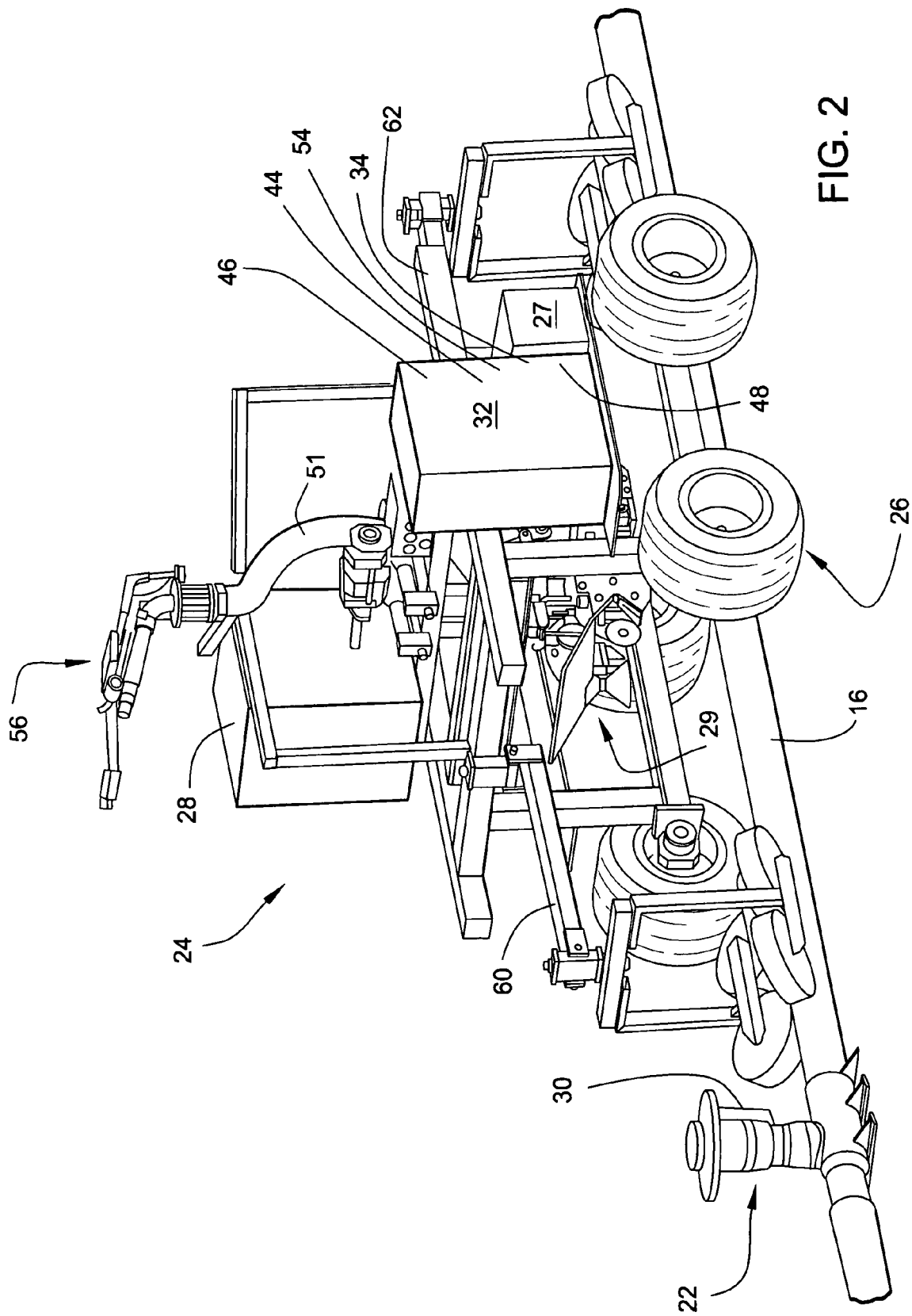
FIG. 2 is an isometric drawing of one embodiment of one mobile sprinkler in an undocked and traveling position, approaching a hydrant.
Figure 3:
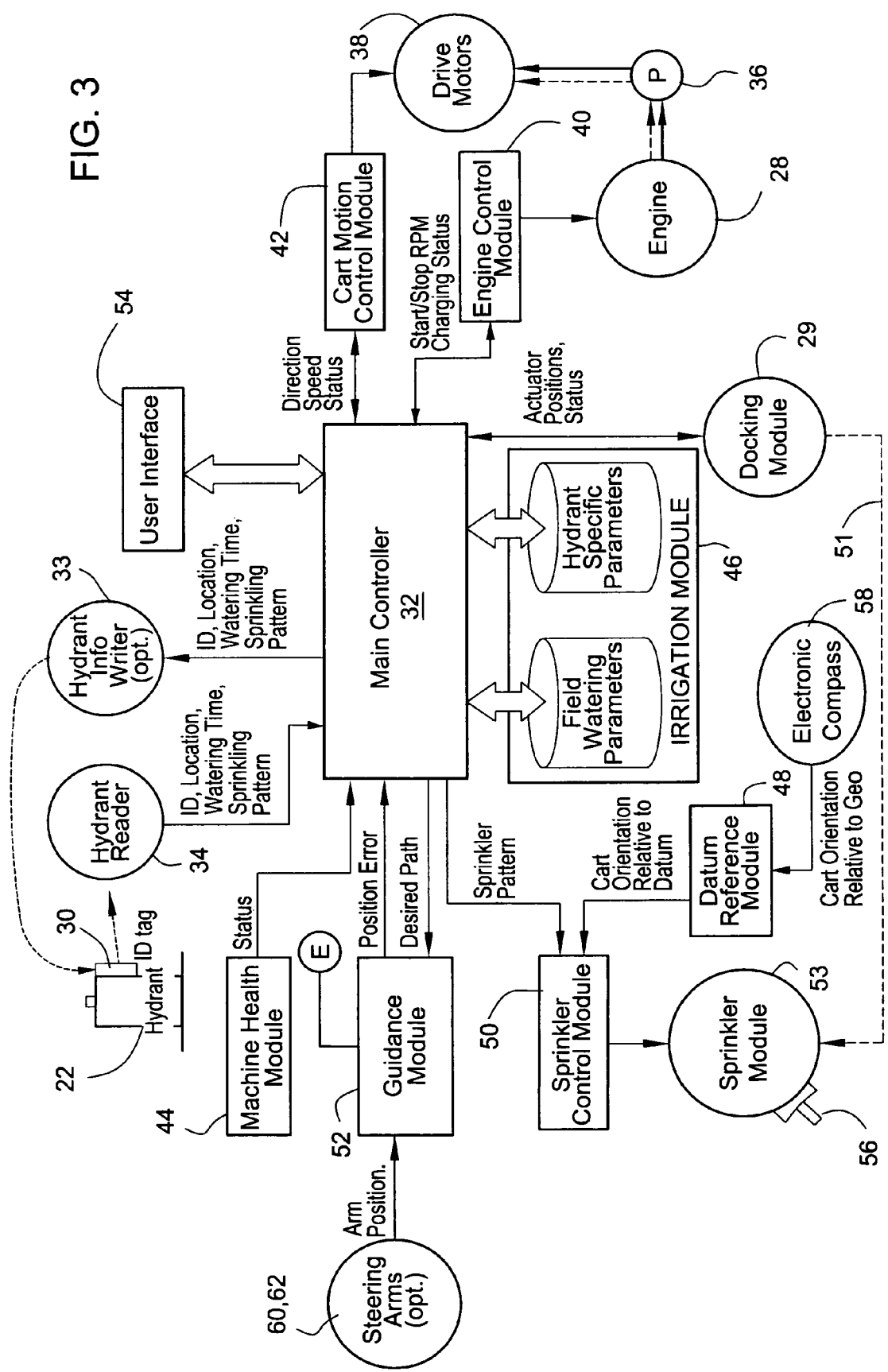
FIG. 3 is a flow diagram illustrating various inputs to a sprinkler main controller including information received from hydrants having RFID tags attached thereto.

With reference to both FIGS. 2 and 3, each hydrant 22 is configured to mate with a Docking Module 29 on the mobile sprinkler cart 24 and acts as a port to fluidly connect the mobile sprinkler cart to the sprinkler system supply pipe 16. In one embodiment, an ID tag 30 (preferably an RFID tag) is borne by the hydrant and is operable to provide information to the mobile sprinkler cart 24 via the vehicle-mounted Main Controller 32. This information includes a unique hydrant identifier which identifies or otherwise "names" the hydrant. In one nonlimiting embodiment, the ID tag 30 periodically emits an electromagnetic signal with data encoded on the signal. In one implementation of the embodiment, the unique identification includes the geographic location coordinates for the hydrant as referenced to a standard, for example, the latitude and longitude of the hydrant, thus providing sufficient information to guide the mobile sprinkler cart to the hydrant (whether or not the cart is following an above-ground pipe).

The ID tag 30 may be configurable by the mobile sprinkler cart Main Controller 32 and includes information storage capability so that it may be updated by the Main Controller 32 in a hydrant or ID Information Writer Module 33. The ID tag 30 may be updated with information regarding the time, duration, and volumetric flow level of the hydrant. The ID tag 30 may also store the irrigation time, sprinkler arc parameters, and desired water pressure. This feature is especially useful in multiple mobile sprinkler installations where hydrant information is updated during irrigation and can be read by other mobile sprinkler carts. In other words, the hydrant can store and share up-to-date information which is also useful to other mobile sprinkler carts upon docking with that same hydrant.

With continuing reference to FIGS. 2 and 3, the mobile sprinkler cart 24 may also include an ID or Hydrant Reader Module 34. The ID Reader Module 34 is configured to gather information from the ID tag 30 positioned on each of the plurality of hydrants 22. In one implementation, the ID tag 30 and Reader Module 34 utilize semi-active RFID technology, although other technologies known in the art may be utilized without departing from the scope of this invention including bar code tags, passive RFID tags, active RFID tags, or magnetically encoded tags.

The mobile sprinkler cart 24 also includes various subsystems or modules that control all aspects of the mobile sprinkler discussed further hereinbelow, all of which feed information to and/or receive information from the Main Controller 32.

As already noted above, the mobile sprinkler cart 24 is configured to travel on the ground and to engage the various hydrants 22 located along the system pipe 16 under the power supplied by the diesel engine 28. The latter also powers a hydraulic pump 36 that propels hydraulic fluid through a valve and piping system which connects to a plurality of hydraulic drive motors 38, each driving one of the respective cart wheels 26. Alternatively, the mobile sprinkler cart 24 may be powered by a battery 27 and propelled by electric motors or other combinations that are known in the art. The engine 28 is governed by the Main Controller 32 via an Engine Control Module 40, while the drive motors 38 receive input from a Cart Motion Control Module 42.

The Docking Module 29 is configured to engage and dock with a hydrant 22 when the mobile sprinkler cart 24 is positioned over the hydrant in a watering position. The docking procedure per se generally may be as described in the above-identified commonly-owned '004 patent. It will be appreciated that the Docking Module 29 includes an automatic valve opening device adapted to engage and open a valve accessible from the top of the hydrant. Upon disengagement, the valve is automatically closed. The valve opening mechanism may be as disclosed in the above-identified co-pending '296 application.

The Main Controller 32 communicates with a Machine Health Module 44, Irrigation Module 46, Datum Reference Module 48, Sprinkler Control Module 50, Guidance Module 52, and User Interface 54.

The Machine Health Module 44 monitors the status of, and controls those functions of the mobile sprinkler cart 24 that are necessary to ensure safety and fitness. This module is operable to override any of the other modules of the Main Controller 32 when necessary.

The Irrigation Module 46 is operable to query a user-configurable database that contains irrigation parameters necessary to appropriately distribute water over the area covered by the mobile sprinkler cart 24. These irrigation parameters may include overall field watering parameters and hydrant specific parameters. The overall field watering parameters govern the sprinkling policies for the field and may include hydrant sequencing, irrigation water availability schedules, end of course (or field) instructions, time between active watering periods, etc. It will be understood that hydrant specific parameters govern the sprinkling pattern proximate to a specific hydrant 22. These parameters may include hydrant dwell time, sprinkling pattern shape, watering time, and watering pressure. The Irrigation Module 46 may also receive input from other sensors or communication systems which may influence the suitability of specific irrigation policies. This input may include information from a variety of sources and may include wind speed and direction information, accumulated rainfall and rain rates, evapotranspiration rates, temperature, humidity, solar radiation, time of day, and day of year. Actions initiated by the Irrigation Module 46 may be modified based on this information as governed by the sprinkling policies. The Irrigation Module 46 also contains the overall watering schedule clock. The Irrigation Module also receives information from the ID Reader Module 34 via the Main Controller 32.

In one embodiment, the Irrigation Module 46 calculates the volume of water expelled from the sprinkler by integrating an instantaneous flow rate from a sprinkler-nozzle-specific look-up table as a function of measured water pressure. The Irrigation Module 46 compares a desired total accumulated volume of water to this calculated accumulated volume of water to determine when an irrigation cycle is complete.

The Datum Reference Module 48 provides a current angular offset reading regarding the specific orientation of the sprinkler 56 relative to a datum reference. This datum reference is established at the time of installation and is used as the reference in the user configurable database. The current angular offset may be inferred by the module from information provided by the Guidance Module 52 or from monitoring the readings from a vehicle-mounted electronic compass 58 over a pre-defined course of travel as the mobile sprinkler travels to the appropriate hydrants. This angular offset information is important for providing repeatable hydrant specific watering patterns at each hydrant regardless of the orientation of the mobile sprinkler relative to the datum reference.

The Sprinkler Control Module 50 is configured to respond to commands from the Main Controller 32 and to receive input from the Datum Reference Module 48.

More specifically, the Sprinkler Control Module 50 is mounted in fluid communication with the Docking Module 29 by a fluid conduit 51. In this manner, water from the sprinkler supply pipe 16 is routed through the hydrant 22, and through the Docking Module 29 to the Sprinkler Module 53 where it is emitted from the sprinkler 56. The Sprinkler Control Module 50 is configured to adjust the Sprinkler Module 53 in accordance with the hydrant specific parameters, and thus control the sprinkler 56.

The sprinkler 56 is rotatable in a plane approximately parallel with the surface of the ground over an arc. The sprinkler may be of the type sold by the assignee, Nelson Irrigation Corporation, under the name "Big Gun"® but other sprinklers are suitable as well. The Sprinkler Control Module 50 is configured to controllably project an arc as the stream passes through and is expelled by the nozzle of the sprinkler 56. The Sprinkler Control Module 50 is configurable to control a number of the sprinkling parameters including the arc pattern, sprinkling trajectory, sprinkler pressure, pattern speed, and flow rate. The Guidance Module 52 provides information to the Main Controller 32. The Cart Motion Control Module 42 is configured to maneuver the mobile sprinkler cart 24 to the next hydrant 22 in the sequence in accordance to the overall field watering policy. In the embodiment shown in FIG. 2, the Guidance Module 52 utilizes front and rear pipe following assemblies or steering arms 60, 62 to ascertain the direction to the next appropriate hydrant 22, and to steer the vehicle in the appropriate path.

It will be appreciated that the various modules, including the Hydrant Reader Module 34, the Machine Health Module 44, the Datum Reference Module 48 and the Guidance Module 52 may be physically located within the cabinet housing the Main Controller 32. Sprinkler Control Module 50 may be located in proximity to the sprinkler 56, with the remaining modules located appropriately and conveniently on the mobile sprinkler cart 24.

Figure 4:
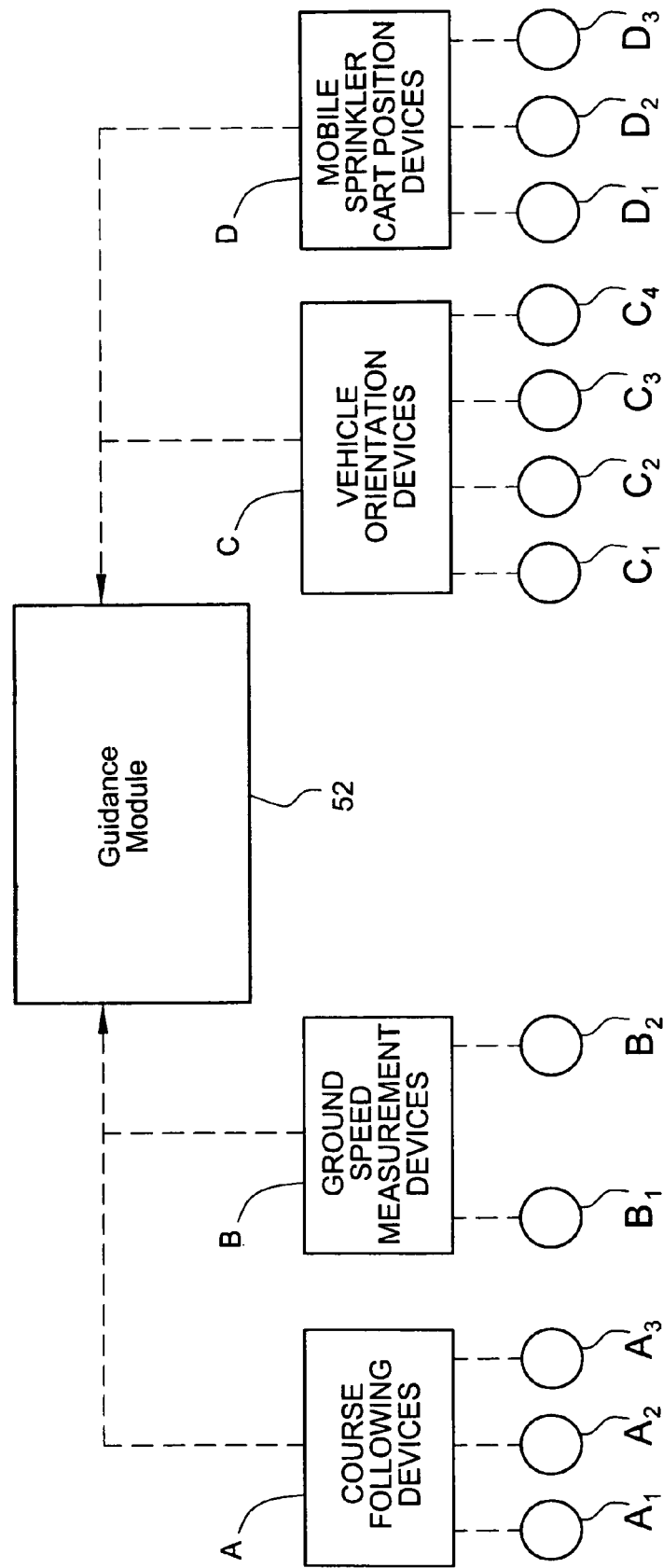
FIG. 4 is an expanded schematic diagram of a module taken from FIG. 3.

In other embodiments, the Guidance Module 52 may include a variety of sensors (FIG. 4) that determine the mobile sprinkler cart's position and adjust its course as it commands the vehicle during its trek between hydrants 22. These sensors may include, but are not limited to course-following devices A, ground speed measurement devices B, vehicle orientation devices C, and mobile sprinkler cart position devices D. The course-following devices A may include pipe-following sensors $A_1$, wire-following sensors $A_2$ and hydrant-homing mechanisms $A_3$. The ground speed measurement devices B may include but are not limited to wheel index sensors $B_1$ and radar speed sensors $B_2$. The vehicle orientation devices C may include but are not limited to electronic gyroscopes $C_1$, compasses $C_2$, tilt sensors $C_3$ and accelerometers $C_4$. The mobile sprinkler cart position devices D may include but are not limited to GPS receivers $D_1$, dead reckoning modules $D_2$ and localized time of flight triangulation systems $D_3$, with input to the Guidance Module 52 via Main Controller 32.

In one embodiment, the Guidance Module 52 forms a computational engine and receives a plurality of signals from a group of adjacent or proximate RFID tags 30 located on the hydrants 22. In this embodiment, each signal is associated with a specific hydrant, and its relative time of flight is used to determine the present location of the mobile sprinkler cart 24 in relation to its desired destination. The direction and speed of the mobile sprinkler cart 24 is varied in response to this information.

In yet another embodiment, the Guidance Module 52 includes a steerable antenna E (FIG. 3) which is used to determine a relative orientation between the mobile sprinkler cart 24 and a desired destination hydrant 22. This steerable antenna may be operated in either a null or lobe mode, and may be a Yagi-uda parasitic array or a loop antenna.

The User Interface 54 is provided to enable a user to specify various irrigation parameters and to select watering policies which govern the operation of the mobile sprinkler cart. The User Interface 54 also provides status, maintenance, and alarm information to the user. In another embodiment, the User Interface 54 includes a communication link which is operable to enable the mobile sprinkler to provide status and be commanded by a remote device such as a computer or cell phone.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An irrigation system comprising:
    a portable sprinkler;
    a system water supply pipe supporting a plurality of hydrants adapted to be engaged by the portable sprinkler and to supply water to the portable sprinkler;
    an addressable electronic ID tag mounted on each hydrant;
    data stored on said addressable electronic ID tag, said data comprising at least hydrant identification, location, watering time and sprinkling pattern parameters for each hydrant, respectively;
    a main controller programmed to control operation of the portable sprinkle;
    a user interface including a communication link that is configured to receive commands from a remote device for programming and controlling the operation of the portable sprinkler,
    wherein said main controller includes a hydrant reader module by which said data is received from said ID tag, said main controller further comprising a sprinkler control module that provides sprinkling data to a sprinkler module that is programmed to operate the sprinkler in accordance with said data received by the main controller from said ID tag on said hydrant.

2. The irrigation system of claim 1 further comprising a docking module arranged to permit said portable sprinkler to engage said hydrant and to supply water to the portable sprinkler.

3. The irrigation system according to claim 2 wherein said portable sprinkler comprises a sprinkler head mounted on a mobile sprinkler cart, and wherein said main controller further comprises a cart motion control module that controls movement of said mobile sprinkler cart to direct travel to at least a portion of a plurality of said hydrants in a sequence dictated by said main controller via input from said ID tags on said hydrants.

4. The irrigation system according to claim 1 wherein said portable sprinkler comprises a sprinkler head mounted on a mobile sprinkler cart, and wherein said main controller further comprises a cart motion control module that controls movement of said mobile sprinkler cart to direct travel to at least a portion of a plurality of said hydrants in a sequence dictated by said main controller via input from said ID tags on said hydrants.

5. The irrigation system of claim 4 wherein said mobile sprinkler cart is driven by an engine controlled by an engine control module directed by said main controller, said engine supplying power to one or more drive motors under control of said cart motion control module.

6. The irrigation system of claim 5 wherein a guidance module receives cart position data from one or more sources and uses said cart position data to formulate instructions to said cart motion control module.

7. The irrigation system of claim 6 wherein said one or more sources includes plural sensors for determining the position of the mobile sprinkler cart and for adjusting the mobile sprinkler cart's position relative to a selected hydrant.

8. The irrigation system of claim 7 wherein said plural sensors comprise course-following devices selected from a group consisting of pipe following sensors, wire following sensors and hydrant homing mechanisms.

9. The irrigation system of claim 7 wherein said plural sensors comprise ground-speed measurement devices selected from a group consisting of wheel index sensors and radar speed sensors.

10. The irrigation system of claim 7 wherein said plural sensors include vehicle orientation devices selected from a group consisting of electronic gyroscopes, compasses, tilt sensors and accelerometers.

11. The irrigation system of claim 7 wherein said plural sensors include mobile sprinkler cart position devices selected from a group consisting of GPS receivers, dead reckoning modules and localized time of flight triangulation systems.

12. The irrigation system of claim 6 wherein said guidance module is configured to receive a plurality of signals from a group of adjacent or proximate RFID tags located on said hydrants, each signal associated with a specific one of said hydrants, wherein relative signal time of flight is used to determine a current location of the mobile sprinkler cart relative to a desired destination hydrant.

13. The irrigation system of claim 6 wherein the guidance module includes a steerable antenna used to determine a relative orientation between the module sprinkler cart and a desired destination hydrant.

14. The irrigation system of claim 13 wherein said steerable antenna comprises a Yagi-uda parastic array antenna.

15. The irrigation system of claim 13 wherein said steerable antenna comprises a loop antenna.

16. The irrigation system according to claim 1 wherein said main controller further comprises a machine health module that monitors status of a plurality of safety-related criteria, said machine health module adapted to shut down said portable sprinkler if threshold criteria levels are exceeded.

17. The irrigation system according to claim 1 wherein said main controller further comprises an irrigation module that inputs field watering and hydrant specific parameters to said main controller.

18. The irrigation system according to claim 1 wherein said main controller further comprises a hydrant information writer module adapted to transmit data to said ID tag.

19. The irrigation system of claim 1 wherein said ID tag comprises an RFID tag.

20. The irrigation system of claim 1 wherein said water supply pipe is above ground.

21. The irrigation system of claim 20 wherein said portable sprinkler comprises a sprinkler head mounted on a mobile sprinkler cart, and wherein said mobile cart is provided with at least one steering arm assembly adapted to engage said water supply pipe and provide arm position data to a guidance module.

22. The irrigation system of claim 21 wherein said at least one steering arm assembly comprises a pair of steering assemblies extending forward and rearward, respectively, of said mobile sprinkler cart.

23. The irrigation system of claim 1 wherein said water supply pipe is underground.

24. The irrigation system of claim 1 wherein said main controller is programmable by a user-accessible microprocessor.

25. An irrigation system comprising:
    a portable sprinkler;
    a system water supply pipe supporting a plurality of hydrants adapted to be engaged by the portable sprinkler and to supply water to the portable sprinkler;
    an addressable electronic identification tag mounted on each hydrant;
    sprinkler data stored on said addressable electronic identification tag, said sprinkler data comprising irrigation time, duration and volumetric flow level for each hydrant, respectively;

a main controller programmed to control operation of the portable sprinkler; and a user interface including a communication link that is configured to receive commands from a remote device for programming and controlling the operation of the portable sprinkler, wherein said electronic identification tag is programmed to send signals encoded with said sprinkler data to said main controller, said main controller further comprising a sprinkler control module that provides said sprinkling data to a sprinkler module that is programmed to operate the portable sprinkler in accordance with said sprinkling data received by the main controller from said electronic identification tag on said hydrant.

26. The irrigation system according to claim 25 and further comprising a docking module arranged to permit said portable sprinkler to engage said hydrant and to supply water to the portable sprinkler.

\* \* \* \* \*